United States Patent [19]
Coquerel

[11] Patent Number: 5,396,246
[45] Date of Patent: Mar. 7, 1995

[54] DEVICE FOR THE DIGITAL COMBINATION OF SIGNALS

[75] Inventor: Patrick Coquerel, Sartrouville, France

[73] Assignee: Institut Francais Du Petrole, Rueil Malmaison, France

[21] Appl. No.: 135,399

[22] Filed: Oct. 13, 1993

[30] Foreign Application Priority Data
   Oct. 13, 1992 [FR] France .................. 92 12388

[51] Int. Cl.$^6$ .......................................... H03M 1/12
[52] U.S. Cl. .................................................. 341/155
[58] Field of Search ............... 341/155, 143, 159, 160; 375/26, 27, 28

[56] References Cited

U.S. PATENT DOCUMENTS

| | | | |
|---|---|---|---|
| 2,698,927 | 1/1955 | Parr, Jr. ................ | 340/15 |
| 2,747,172 | 5/1956 | Bayhi ..................... | 340/15 |
| 3,400,783 | 9/1968 | Lee et al. ................ | 181/5 |
| 3,862,200 | 1/1975 | Shepherd, Jr. .......... | 260/448 A |
| 3,862,201 | 1/1975 | Koenig et al. .......... | 260/453 P |
| 4,866,442 | 9/1989 | Steim et al. ............. | 341/143 |
| 4,886,442 | 9/1989 | Steim et al. ............. | 341/143 |
| 4,943,807 | 7/1990 | Early et al. ............. | 341/120 |
| 4,968,987 | 11/1990 | Naka et al. ............. | 341/143 |
| 4,994,804 | 2/1991 | Sakaguchi ............... | 341/143 |
| 5,075,679 | 12/1991 | Gazsi ...................... | 341/143 |
| 5,126,961 | 6/1992 | Garverick ............... | 364/724 |

FOREIGN PATENT DOCUMENTS

| | | | |
|---|---|---|---|
| 0256282 | 2/1988 | European Pat. Off. | ....... A61B 8/12 |
| 2157516 | 10/1985 | United Kingdom | .......... H03M 3/00 |
| 9205739 | 4/1992 | WIPO | .............................. A61B 6/02 |

*Primary Examiner*—Brian K. Young
*Attorney, Agent, or Firm*—Antonelli, Terry, Stout & Kraus

[57] ABSTRACT

Analog signals picked up by sensors are oversampled and converted locally for example into streams of 1-bit digital words and, without any previous formatting are transmitted on transmission channels to a central station. The central station includes a storage and a combining circuit for combining and weighting directly these 1-bit words, as well as a filter for reconstituting, from the combinations, high-resolution digital words.

A preferred application is combining of acoustic or seismic signals.

15 Claims, 2 Drawing Sheets

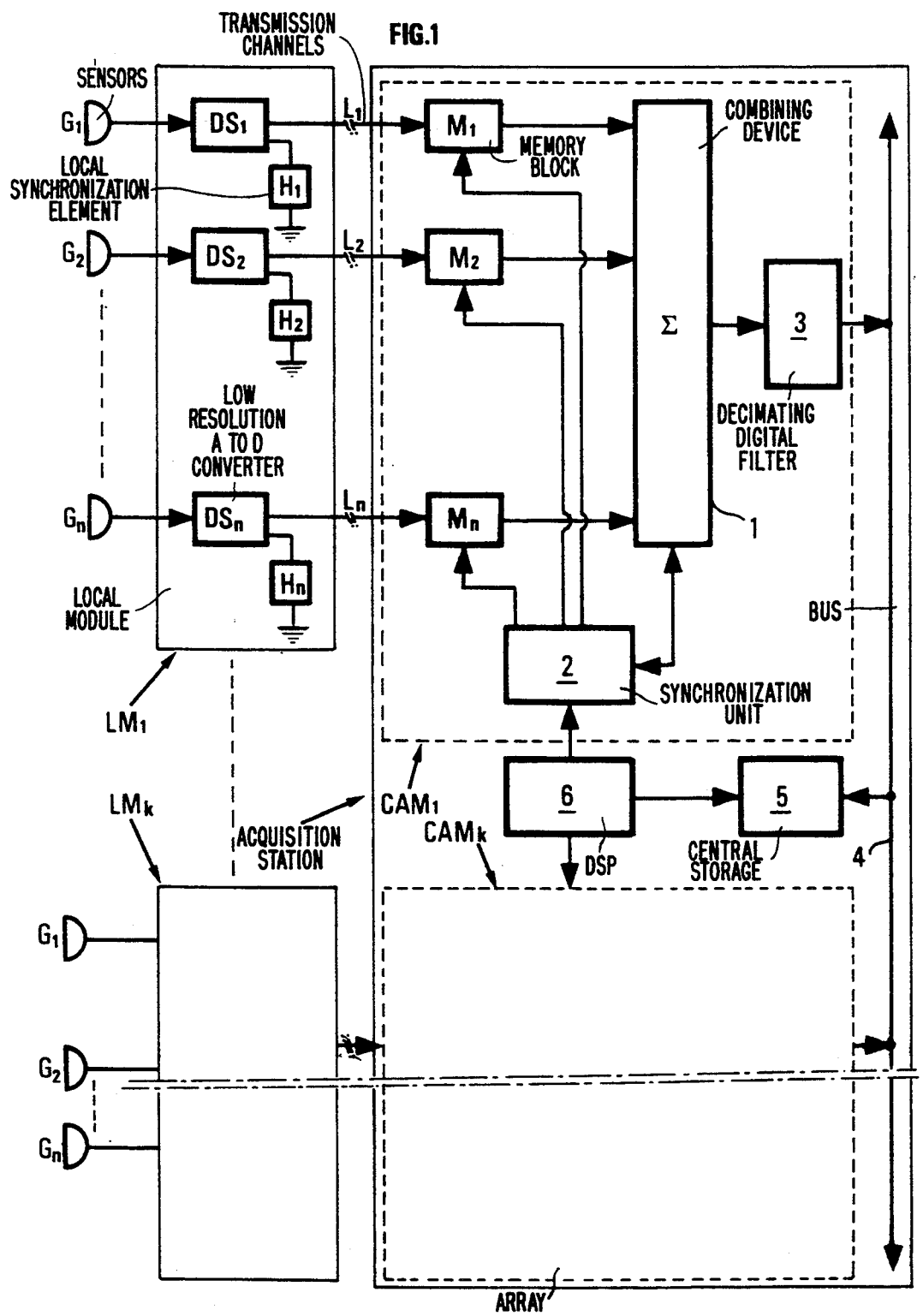

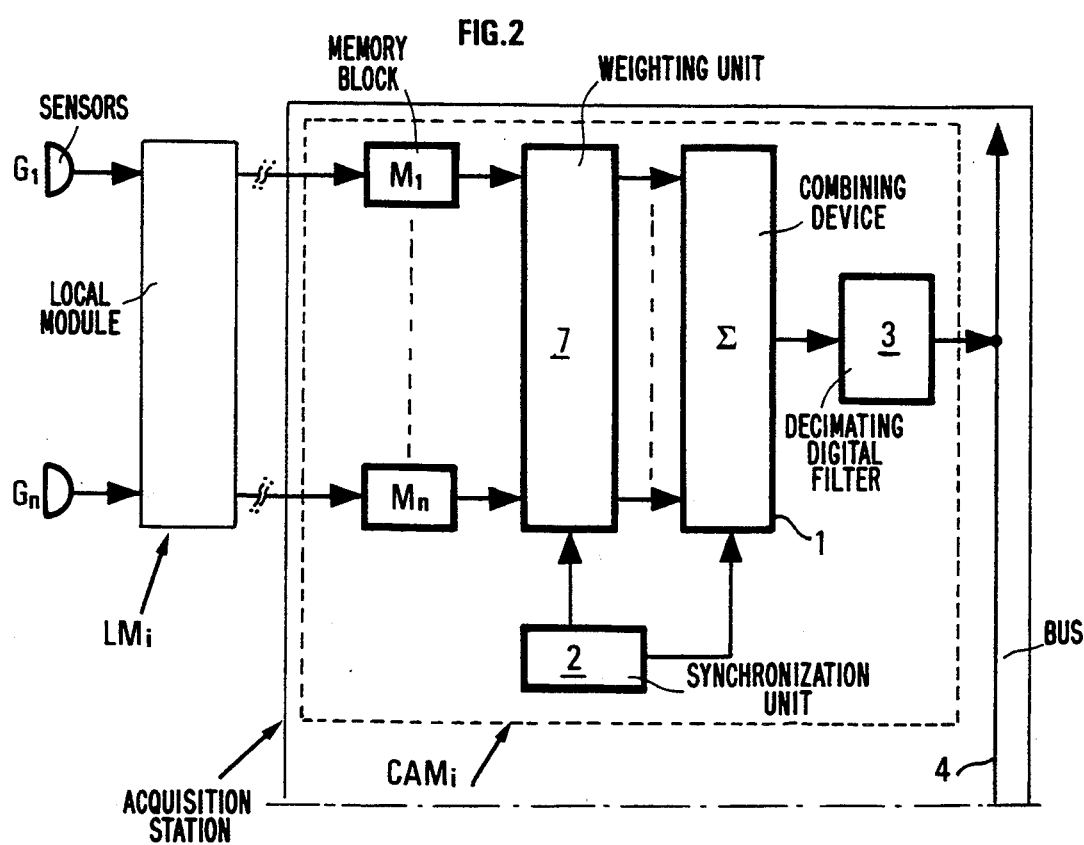

DEVICE FOR THE DIGITAL COMBINATION OF SIGNALS

FIELD OF THE INVENTION

The present invention relates to a digital signal processing and a device allowing signals received by several sensors to be combined with each other.

More precisely, the object of the invention is to provide a process and a device for combining signals converted into low-resolution digital words by analog-to-digital conversion means of the oversampling type, and for producing a combination signal in digitized form.

BACKGROUND OF THE INVENTION

The analog-to-digital conversion technique by oversampling which is currently often used is implemented by means of delta-sigma modulators which deliver low-resolution digital words, such as for example 1-bit words, by sampling the analog signals applied at a very high sampling frequency fs (fs=$512*F_{Nyquist}$ for example), the digital words produced having a mean amplitude which varies in time proportionally to the amplitude of the analog signal applied thereto. A digital filter is connected to the modulator output in order notably to filter the quantization noise, this filter producing digital words with a higher resolution (16 to 24 bits for example) and a much lower frequency, an operation known as decimation. Converters of this type are for example described in U.S. Pat. Nos. 4,866,442, 4,943,807, 4,994,804, etc.

There are notably applications, in the field of acoustics or seismic prospecting, where signals received by sensors have to be combined. Combinations of several signals may be for example achieved after they have been possibly weighted and/or filtered or phase-shifted, or more complex combinations of these multiple signals may be achieved. This is particularly the case in seismic prospecting, where a very great number of receivers is distributed over a zone to be explored in order to receive seismic waves reflected by the subsoil discontinuities in response to jogs caused by the triggering of a source of seismic waves. The receivers most often consist of several elementary sensors interconnected electrically and arranged in the explored zone so as to filter an organized surface noise. Each of these receivers provides a "seismic trace" which is an electrical signal average of the signals produced by the interconnected elementary sensors.

It is well-known that the relative arrangement of the various sensors constituting a single "trace" has a great likelihood of obtaining a good rejection of the surface noise. It is also well-known that, by framing the amplitude and/or the frequency spectrum of the signals produced respectively by the various signals forming a single trace before the combination thereof, it is possible to obtain a considerable attenuation of the noise level and therefore to preserve better the dynamics of the digitization means of the useful signals.

Weighting devices of the active or passive type for changing the amplitudes, frequency spectra or signal phases received by sensors before the combination thereof and which are placed in the vicinity of these sensors are for example described in U.S. Pat. Nos. 2,698,927, 2,747,172, 3,400,783, 3,863,200, 3,863,201.

The main drawback of all the analog preprocessing equipments lies mainly in the lack of flexibility. The filtering parameters must be known in advance and, assuming that the reception device that has been effectively set allows these parameters to be modified, adaptations are also necessary on the site where these local processing means have been installed, which extends the setting operations. Besides, the adjustments which have possibly been achieved before use cannot be changed easily during the recording of the pick up signals.

A technique which is currently used to combine signals consists in converting into digital words of 8, 16 or 32 bits, for example, analog signals to be combined and in utilizing a digital computer programmed to carry out the desired combinations.

This solution may be suitable for a limited number of signals but it becomes highly complex and above all costly for a relatively great number of signals. Within the scope of certain applications, notably in geophysics, where 500 to 4000 different channels are to be taken into account for example, a recording laboratory capable of acquiring all these channels with sufficient dynamics (20 to 24 bits for example) would reach a prohibitive cost.

SUMMARY OF THE INVENTION

The process according to the invention allows very different combinations of analog signals coming from a relatively large number of sensors to be achieved under economically advantageous conditions. It comprises:
  converting each of the analog signals to be combined into low-resolution digitized signals;
  combining said low-resolution digitized signals, and
  changing the digitized signals resulting from said combination into digitized signals of higher resolution.

The process may also comprise weighting at least part of the low-resolution digitized signals before the combination thereof and transmitting the digitized signals on one or several transmission channels prior to said combination.

The device for implementing the process includes means for converting each of the analog signals into low-resolution oversampled digitized signals, means for combining the various formed digitized signals and filtering means for changing the digitized signals from the combination means into higher-resolution digitized signals. It may further comprise weighting means for modifying at least part of the digitized signals coming from the conversion means before the application thereof to said combination means, and interposed transmission means (transmission line, Hertzian channel, optical fiber, etc), these means being suited for the transmission of the low-resolution digitized signals for example. The means for converting analog signals into digitized signals of low resolution and high rate include for example oversampling delta-sigma modulators producing bit streams, and addressable memory blocks for the bit streams corresponding respectively to the different signals, the combination means include a combining circuit and a control unit for transferring selectively into the combining circuit the digitized signals read at addresses selected in the various memory blocks, and filtering means for changing the low-resolution digitized signals from the combining circuit into digitized signals of higher resolution.

The weighting means may comprise digital multiplication means for multiplying the digitized signals coming from the memory blocks, so as to modify at any time their weight in relation to each other before the application thereof to said combining circuit.

The process and the device according to the invention allow, with relatively simple and inexpensive local modules positioned in the vicinity of signal reception locations, the received signals to be transferred individually to an acquisition station and to be combined at will more simply than with the processes known in the art, so as to form signals with a better background noise rejection. The process and the device are very flexible as for the possible selection of the signal combinations and are less costly, which is particularly beneficial when a large and complex array of signal sensors is used, as it is the case in seismic prospecting for example.

BRIEF DESCRIPTION OF THE DRAWINGS

Other features and advantages of the device according to the invention will be clear from reading the description hereafter of embodiments given by way of non limitative examples, with reference to the accompanying drawings in which:

FIG. 1 shows a first embodiment of the device applied to sensors such as seismic sensors; and FIG. 2 shows a variant of the previous embodiment including weighting means.

DESCRIPTION OF THE PREFERRED EMBODIMENTS

According to the embodiment of FIG. 1, the device is associated with at least one array of sensors G1, G2 . . . Gn delivering analog signals which are to be combined in a specific way, modifiable at will and at any time. To that effect, a local module LM1 . . . LMk is associated with each array of sensors. Each module LM1 to LMk includes low resolution analog to digital converter DS1, DS2 . . . DSn associated respectively with the various sensors G1 to Gn. These elements $DS_1$–$DS_n$ convert the analog signal coming from sensor G1 to Gn into a sequence of digitized signals or digital words of low resolution, at a high sampling frequency set by a local synchronization element H1, H2 . . . Hn. Elements DS1 to DSn are for example modulators of the delta-sigma type producing 1-bit digital words at a frequency equal to $512*F_{Nyquist}$. The various streams of digital words coming from the modulators DS1 to DSn of each local module LM1 . . . LMk are transmitted to an acquisition or centralization station AU located at a more or less great distance therefrom. When this station is remote, transmission channels such as transmission lines or optical fibers L1, L2 . . . Ln or possibly Hertzian channels are used, as it is described for example in French patent application 92/10,427 assigned to the same assignee. The transmission of the signals in the form of bit streams allows simplified transmission means to be used.

Each local module LM1 . . . LMk is associated in the acquisition station AU with an array CAM1 . . . CAMk. Each of them includes a plurality of addressable memory blocks M1, M2 . . . Mn receiving respectively the word streams coming from the various modulators MD1 to MDn. The outputs of memory blocks M1 to Mn are connected to n inputs of a combining circuit 1 adapted for stacking together the words extracted simultaneously from the various memory blocks M1 to Mn. The n inputs of combining circuit 1 may be controlled individually so as to select at any time the number of different words which are transferred therein.

The reading orders of the various memory blocks at specified addresses and the transfer of the words read at these addresses in combining circuit 1 are generated by a synchronization unit 2. The combining circuit delivers digital words representative of each stacking and having the same resolution as the various words which are combined. If the digitized words are of the mono-bit type, the sign of the combining achieved is collected at the output of the combining circuit 1.

The combining circuit 1 output is connected to a transformation means 3 of the decimating digital filter type capable of changing the low-resolution words of high sampling frequency (oversampling) from the combining circuit 1 into high-resolution digital words (16-bit or 24-bit words for example) and of delivering them onto a bus 4 so as to transfer them into a central storage unit 5. The acquisition station includes for example a programmable processor 6 of the DSP type for carrying out various processings of the digital words contained in the central memory 5.

The size of each memory block M1 to Mn is selected so as to contain all the digitized words representative of an event, such as for example the analog signal picked up by a geophone for example during the time of a seismic transmission-reception cycle, i.e. several seconds. A writing-reading mode of the "pipeline" type may for example be used, the locations freed at each reading by the combination thereof in combining circuit 1 being used for storing new digital words.

The reading mode of the memories M1 to Mn of each module CAM1 . . . CAMk controlled by synchronization units 2 may be changed by means of central processor 6. An appropriate selection of the reading addresses allows phase shifts to be easily applied between the signals combined by each combining circuit 1. This layout may be useful for combining electrically the signals of several elementary sensors arranged for example in different locations. Introduction of suitable phase shifts between the words read in the memories allows for example a combined signal similar to that which would be obtained if all the elementary sensors were placed in a single location to be obtained.

The embodiment of FIG. 2 is analogous to that of FIG. 1. It is different in that each acquisition or centralization module such as module CAMi shown in the figure also includes a weighting unit 7 interposed between memory blocks M1 to Mn and stacker 1. This weighting unit is adapted for applying to the amplitude of each signal stored a variable gain modifying the relative weight thereof with respect to the other signals extracted from memory blocks M1 to Mn and transferred into stacker 1. The phase shift and/or weighting parameters are worked out for example by processor 6 (DSP). The gains to be applied to the various inputs of weighting unit 7 by digital multiplication are determined by central processor 6 by means of synchronization unit 2. An operator may thus control central processor 6 so that weighting unit 7 applies appropriate gains to the various signals to be stacked so as to improve, if need be, the resulting signals.

The inputs of combining circuit 1 being individually controllable, an operator may also control the selective extraction of digital words from the memory blocks M1 to Mn through combining circuit 1 and the application, to the words extracted, of various processings such as, for example correlations, by means of processor 6.

I claim:

1. A process for producing digital words from a combination of independently sensed analog signals comprising:

oversampling each of the analog signals to produce digital words of a lower resolution;

directly combining the digital words of the lower resolution; and converting the combined digital words of the lower resolution by decimation into digital words of higher resolution.

2. A process in accordance with claim 1 wherein:
the sampling of each of the analog signals is a frequency above $100F_{Nyquist}$.

3. A process for producing digital words from a combination of independently sensed analog signals comprising:

oversampling each of the analog signals to produce digital words of a lower resolution from each of the analog signals;

modifying by weighting at least part of the digital words of the lower resolution;

combining of the modified digital words of the lower resolution; and converting the combined digital words of the lower resolution by decimation into the digital words of higher resolution.

4. A process as recited in claims 1 or 2 further comprising:

transmitting the digital words of the lower resolution on at least one transmission channel prior to combining the lower resolution digital words.

5. A process in accordance with claim 3 wherein:
the sampling of each of the analog signals is a frequency above $100F_{Nyquist}$.

6. A device for producing digital words from a combination of independently sensed analog signals comprising:

converters, coupled to a source of the different analog signals, for converting by oversampling each of the analog signals into digital words of a lower resolution;

a combining device, directly coupled to the converters, for combining the digital words of the lower resolution; and a filter, coupled to the combining device, for converting by decimation the combined digital words of the lower resolution into digital words of a higher resolution.

7. A device for producing digital words from a combination of independently sensed analog signals comprising:

converters, coupled to a source of the different analog signals, for converting by oversampling each of the analog signals to produce digital words of a lower resolution;

a weighting unit, coupled to the converters, for modifying by weighting at least part of the lower resolution digital words;

a combining device, coupled to the converters, for combining the weighted digital words of the lower resolution obtained by oversampling the analog signals; and a filter, coupled to the combining device, for converting by decimation the combined sampled and weighted digital words of the lower resolution into digital words of higher resolution.

8. A device as recited in claims 6 or 7 further comprising:

a transmission channel connecting the converter to the combining device.

9. A device as recited in claims 6 or 7 wherein the converter comprises:

a delta-sigma modulator producing a plurality of bit streams;

a plurality of addressable memory blocks with each memory block being coupled to a different one of the plurality of bit streams produced by the converter for storing the plurality of bit streams; and wherein the combining device includes a control unit for transferring selectively into the combining device the lower resolution digital words read at selected addresses in the memory blocks; and the filter comprises a digital filter.

10. A device as recited in claim 8 wherein the converter comprises:

a delta-sigma modulator producing a plurality of bit streams;

a plurality of addressable memory blocks with each memory block being coupled to a different one of the plurality of bit streams produced by the converter for storing the plurality of bit streams; and wherein the combining device includes a control unit for transferring selectively into the combining device lower resolution digital words read at selected addresses in the memory blocks; and the filter comprises a digital filter.

11. A device as recited in claim 7 wherein the weighting unit comprises:

a digital multiplication unit for multiplying the lower resolution digital words to selectively weight the lower resolution digital words.

12. A device as recited in claim 11 further comprising:

a transmission channel connecting the converter to the combining device.

13. A device as recited in claim 8 wherein:
the transmission channel transmits unformatted lower resolution digital words.

14. A device in accordance with claim 7 wherein:
the converter samples at frequencies above $100F_{Nyquist}$.

15. A device in accordance with claim 8 wherein:
the converter samples at frequencies above $100F_{Nyquist}$.

* * * * *